United States Patent

Anderson et al.

[11] Patent Number: 5,349,348
[45] Date of Patent: Sep. 20, 1994

[54] MULTI-MODE DATA STREAM GENERATOR

[75] Inventors: Karen L. Anderson, Mohegan Lake, N.Y.; Ian R. Finlay, Ontario, Canada; Joan L. Mitchell, Ossining, N.Y.; Davey S. Thornton, Germantown, Md.

[73] Assignee: International Business Machines Corporation, Armonk, N.Y.

[21] Appl. No.: 745,640

[22] Filed: Aug. 15, 1991

[51] Int. Cl.$^5$ .............................................. H03M 7/30
[52] U.S. Cl. ........................................ 341/51; 341/50
[58] Field of Search ..................... 341/51, 50, 59, 67

[56] References Cited

U.S. PATENT DOCUMENTS

| | | |
|---|---|---|
| 4,794,465 | 12/1988 | Van Luyt et al. |
| 4,796,301 | 1/1989 | Uzawa et al. |
| 4,827,339 | 5/1989 | Wada et al. |
| 4,864,572 | 9/1989 | Rechen et al. |
| 4,872,009 | 10/1989 | Tsukiyama et al. ............. 341/51 X |
| 4,897,799 | 1/1990 | Le Gall et al. |
| 4,914,515 | 4/1990 | Van Luyt |
| 4,985,766 | 1/1991 | Morrison et al. |
| 4,985,768 | 1/1991 | Sugiyama |
| 4,992,887 | 2/1991 | Aragaki |
| 5,049,881 | 9/1991 | Gibson et al. ..................... 341/51 X |

OTHER PUBLICATIONS

Julian Nguygen, Eric Hamilton, JPEG File Interchange Format Version 1.0, Apr. 10, 1991.
Davey S. Thornton, Karen L. Anderson, Research Report-A BNF for the JPEG Image Compression Header Structure, RC 16139(#71716) Sep. 28, 1990, Computer Science 4 pages.
Joan L. Mitchell, William B. Pennebaker, Research Report-Evolving JPEG Color Data Compression Standard, RC 16760 (#74155) Apr. 12, 1991, Computer Science 26 pages.
Unix User's Manual Reference Guide, 4.2 Berkely Solftware Distribution Virtual VAX-11 Version, Mar. 1984.
Ian R. Finlay, Karen L. Anderson, JPEG and IBM SAA ImagePlus Workstation Program/2, Electronic Imaging West '91 Paper, Anaheim, Calif., Apr. 16, 1991.

Primary Examiner—Sharon D. Logan
Attorney, Agent, or Firm—Mark S. Walker

[57] ABSTRACT

Improved apparatus and method for encoding and decoding information is disclosed herein. The invention uses the same marker segment information to engage an encoder or a decoder. The technique eliminates many of the complexities associated with building parameter lists, and generating various types of marker segments in a form compatible with both the decode and encode processing.

33 Claims, 3 Drawing Sheets

MULTI-MODE DATA STREAM GENERATOR

Field of the Invention

This invention generally relates to improvements in controlling data stream generators and more particularly to employing pre-validated data stream marker segments to control the encoding and encapsulation of unformatted input data by a data stream generator.

Background of the Invention

In certain applications, it is important to transmit information in a formatted manner. For example, in graphic or imaging applications the resolution of the display may demand that large quantities of information be stored for each static display. A typical display of 1024×1024×256 colors requires 1 Megabyte of storage for each display in uncompressed form. However, by employing various techniques well known in the prior art, the same information can be stored in considerably less space.

A typical prior art solution to reduce the space to store a display is illustrated in FIG. 1. FIG. 1 shows image data 10 input to an encoder 20. The image data does not contain a predefined marker segment or segments, but instead requires control information 70. The control information 70 is typically input as a series of parameters to the encoder 20. The encoder 20 compresses the image data 10 and forms an encoded image data 40 and marker segments 30. This information is stored until the image is used again. At that time, the marker segments 30 and the encoded image data 40 are input to a decoder 50 which generates the de-compressed, reconstructed image data 60.

The problem with this approach is that two sets of code are necessary to process information coming into the encoder and decoder: one to construct the marker segments in the encoder and another to interpret them in the decoder. Our invention eliminates the need for separate sections of code and provides for a single technique for the encoder and decoder. The method and apparatus eliminates much of the complication, processing overhead and maintenance cost associated with the prior art techniques.

SUMMARY OF THE INVENTION

It is thus an object of this invention to provide an improved apparatus and method for encoding and decoding information. The invention uses the same marker segments to control an encoder or a decoder. The technique eliminates many of the complexities associated with specifying and building a plurality of types of marker segments, and placing them in the correct order and location in the generated data stream. Instead, predefined sets of marker segments, often referred to as headers, are generated externally, with the correct ordering and placement of the marker segments that are already used in the decoder. This technique allows the encoder to process marker segment information identically to the decoder.

Pre-canned marker segments are input to the encoder and processed according to preestablished rules that govern the parsing of the marker segments' information. As the marker segments are interpreted, variable fields are filled in and the actual data that is attached to the marker segment is processed to build the complete data stream. The same pre-canned marker segments are attached to the processed data stream before storing it or sending it out for subsequent decoding.

A similar process is used when the information arrives at the decoder. The decoder uses the same code to interpret the marker segment and determine what appropriate steps to invoke. However, the decoder decodes the information and recreates the original information as defined by the application process.

DETAILED DESCRIPTION OF THE INVENTION

Figure 1:
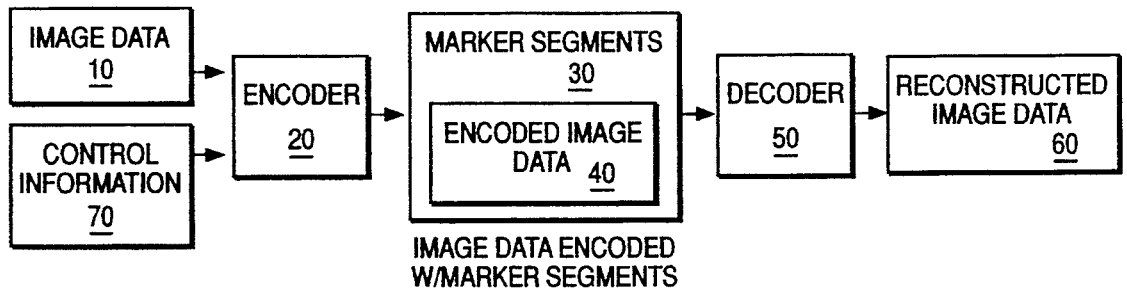
FIG. 1 is a prior art block diagram of an encode/decode processor.

FIG. 1 is a block diagram of a prior art encode/decode processor. Conspicuously absent from the diagram are pre-defined marker segments accompanying the image data 10 into the encoder 20. Thus, the encoder 20 cannot share the operational code in the decoder for analyzing the marker segments and determining which encode operations are appropriate. This information is typically supplied by providing a list of parameter values or control information 70, from which the encoder must construct the marker segments used to encapsulate the data. However, most of the other operations remain unchanged in the subject invention.

Figure 2:
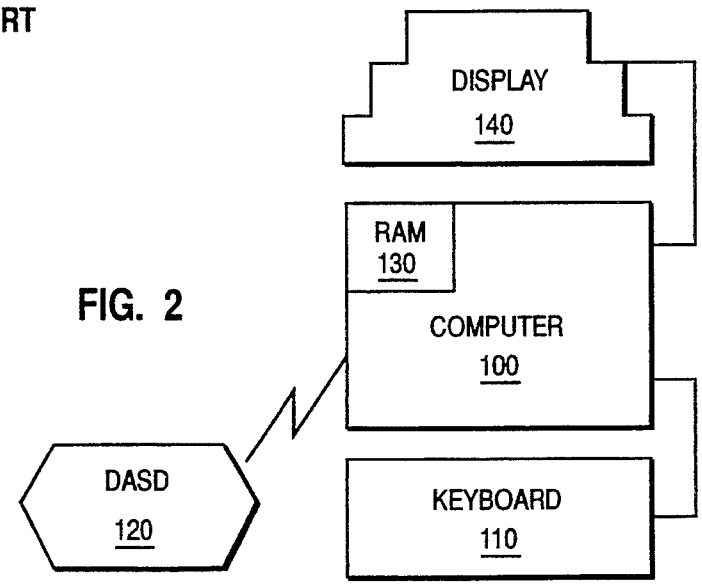
FIG. 2 is a block diagram of a computer in accordance with the present invention.

FIG. 2 is a hardware block diagram in accordance with the subject invention. A computer 100 has a Random Access Memory (RAM) 130, Direct Access Sequential Device (DASD) 120, keyboard 110 and display 140. The display in the preferred embodiment is a color graphic display with a resolution of 1024×1024×256 colors. To store a single display of information in bit mapped form would require over 1 Megabyte of area in RAM or on the DASD. The techniques to save and subsequently store the bit mapped image on DASD are well known in the art. It is also well known in the art to compress the bitmapped information to reduce the amount of information stored on disk. The compression/decompression is accomplished as illustrated in FIG. 1 employing such techniques as a hardware encoder using a run length encoder and a similar hardware decoder. Similarly, arithmetic coders have been used to reduce the amount of information required for saving a bitmapped image.

More recently, an international standard for compressing photographic (grayscale and color) images has been developed called Joint Photographic Experts Group (JPEG). The toolkit of compression techniques defined by JPEG is documented in the ISO Committee Draft (CD) 10918-1, "Digital Compression and Coding of Continuous-tone Still Images, Part 1: Requirements and Guidelines", JPEG-9-R7, 14 February 1991. The file interchange format is described in a joint SUN and C-Cube draft technical memo dated Apr. 10, 1991, entitled, "JPEG FILE INTERCHANGE FORMAT, VERSION 1.0". This document has been widely utilized by programmers to implement systems for compressing and decompressing information and is incorporated by reference herein.

The structure of JPEG compression marker segments is discussed in detail in a document co-authored by Davey Thornton and Karen Anderson, two of the IBM inventors of the subject invention. In the report, entitled, "A BNF for the JPEG Image Compression Header Structure", Sep. 28, 1990, a detailed description of a subset of the JPEG marker segments is provided. The structure of the data stream is detailed for any hardware/software designer to employ in designing an encoder or decoder for the JPEG compression language. This document is also incorporated by reference in its entirety. The marker segments are detailed in Backus-Naur Form (BNF) notation so that the language implementation of the JPEG marker segments can be direct input to a compiler for a context free language. Thus, the syntax can be fed into a compiler like the UNIX Yet Another Compiler Compiler (YACC) to generate a set of tables for a simple automaton which executes an LR(1) parsing algorithm.

Another inventor of the subject invention, Dr. Joan L. Mitchell, published a helpful report entitled, "Evolving JPEG Color Data Compression Standard", Apr. 12, 1991. This report is a useful tool to comprehend the international significance of the JPEG standard. Dr. Mitchell's report is also incorporated by reference in its entirety.

Figure 3:
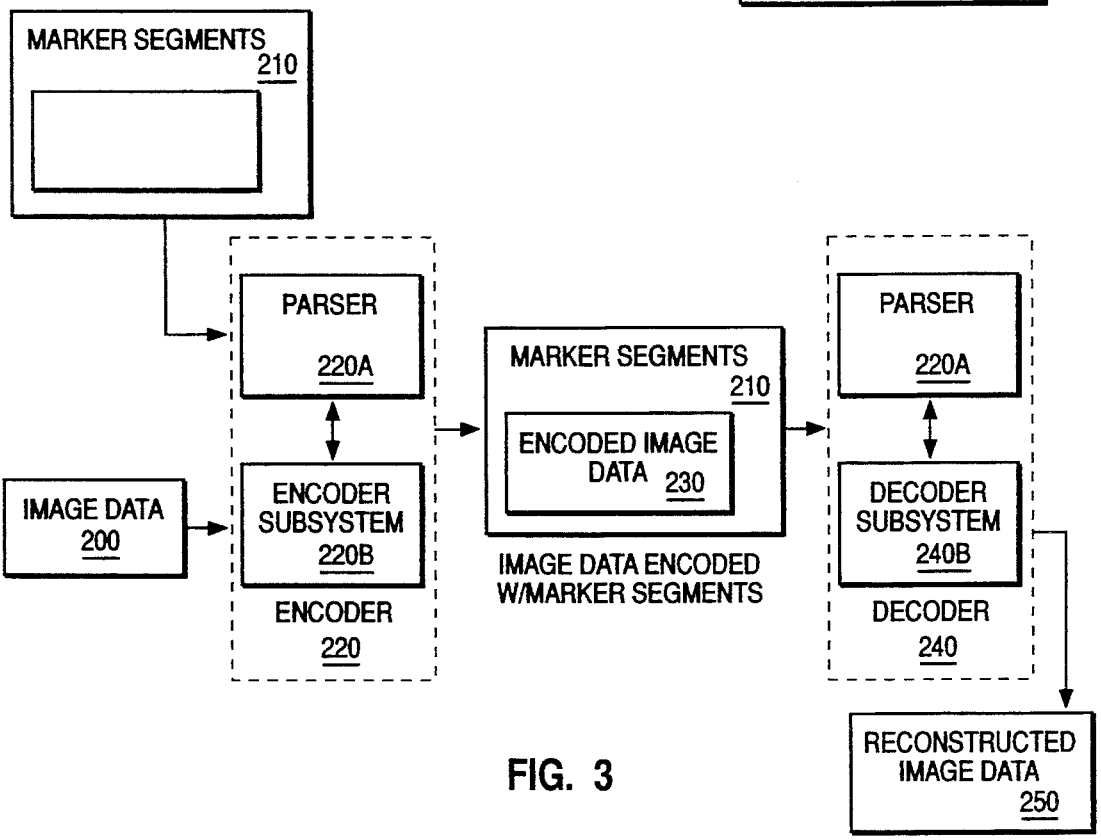
FIG. 3 is a block diagram of an encode/decode processor in accordance with the present invention.

Referring to FIG. 3, a block diagram of the subject invention for encoding or decoding information is detailed. Marker segments 210 are transmitted to the parser portion 220A of the encoder 220. The encoder 220 uses the same code as the decoder 240, namely the parser 220A to parse the marker segments and determine what operations to employ in encoding the image data 200. Image data 200 is transmitted to an encoder subsystem 220B which is a part of the encoder 220. The image data is transmitted as required by the parser 220A under the direction of the marker segments 210.

The encoder 220 stores encoded image data 230 and the original marker segments 210 on the DASD 120 (FIG. 2) or transmits the transaction to a decoder 240. If the transaction is transmitted to the decoder 240, then the decoder parses the marker segments 210 in the same way as the encoder parsed the same marker segments, using the same parser 220A. However, the decoder invokes a set of hardware/software means for decoding the information instead of encoding the information. Finally, the reconstructed image data 250 is output from the decoder 240 for subsequent processing.

Figure 4A:
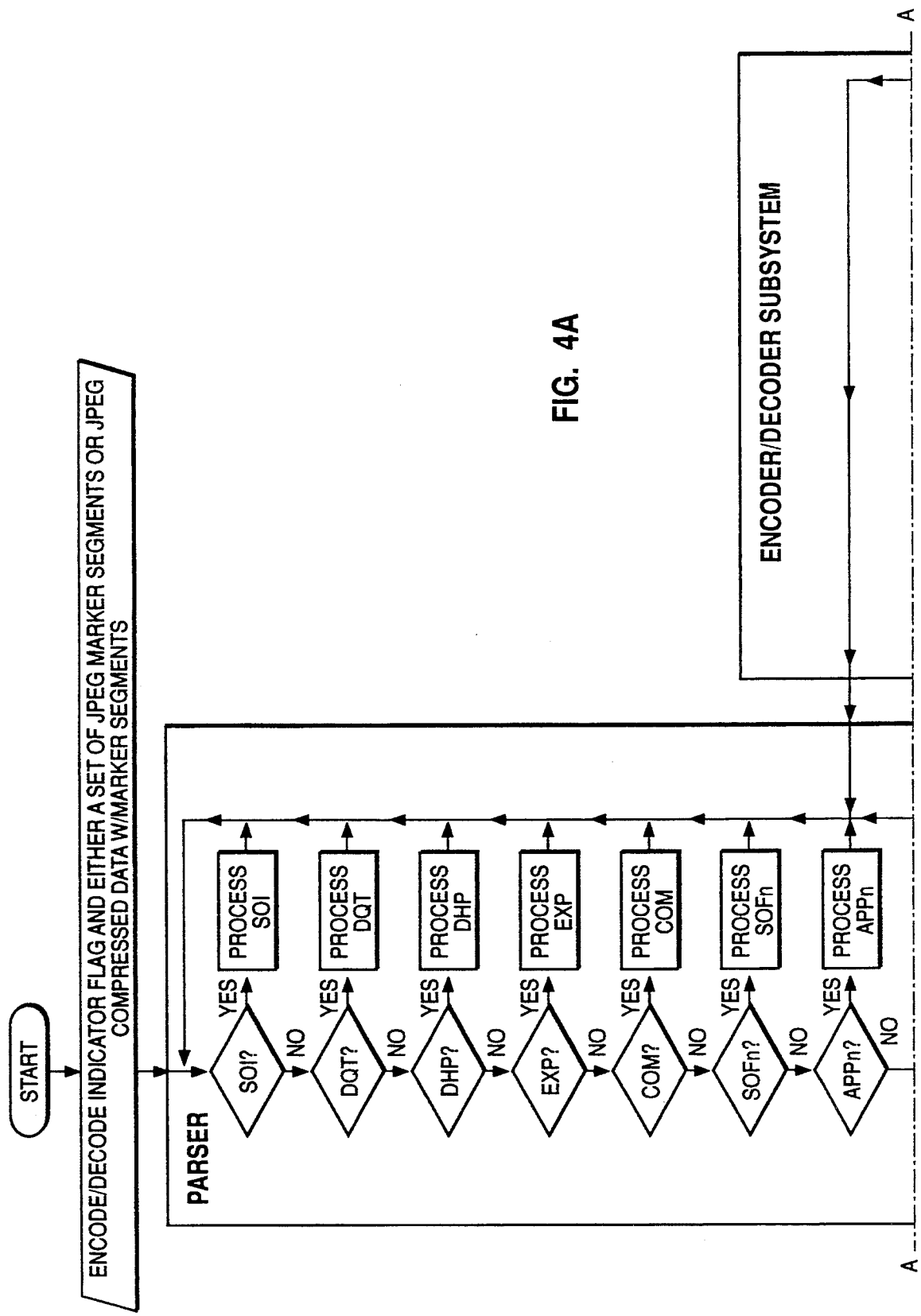
FIGS. 4A and 4B are a flowchart of the encode/decode processor for the preferred embodiment in accordance with the present invention.
Figure 4B:
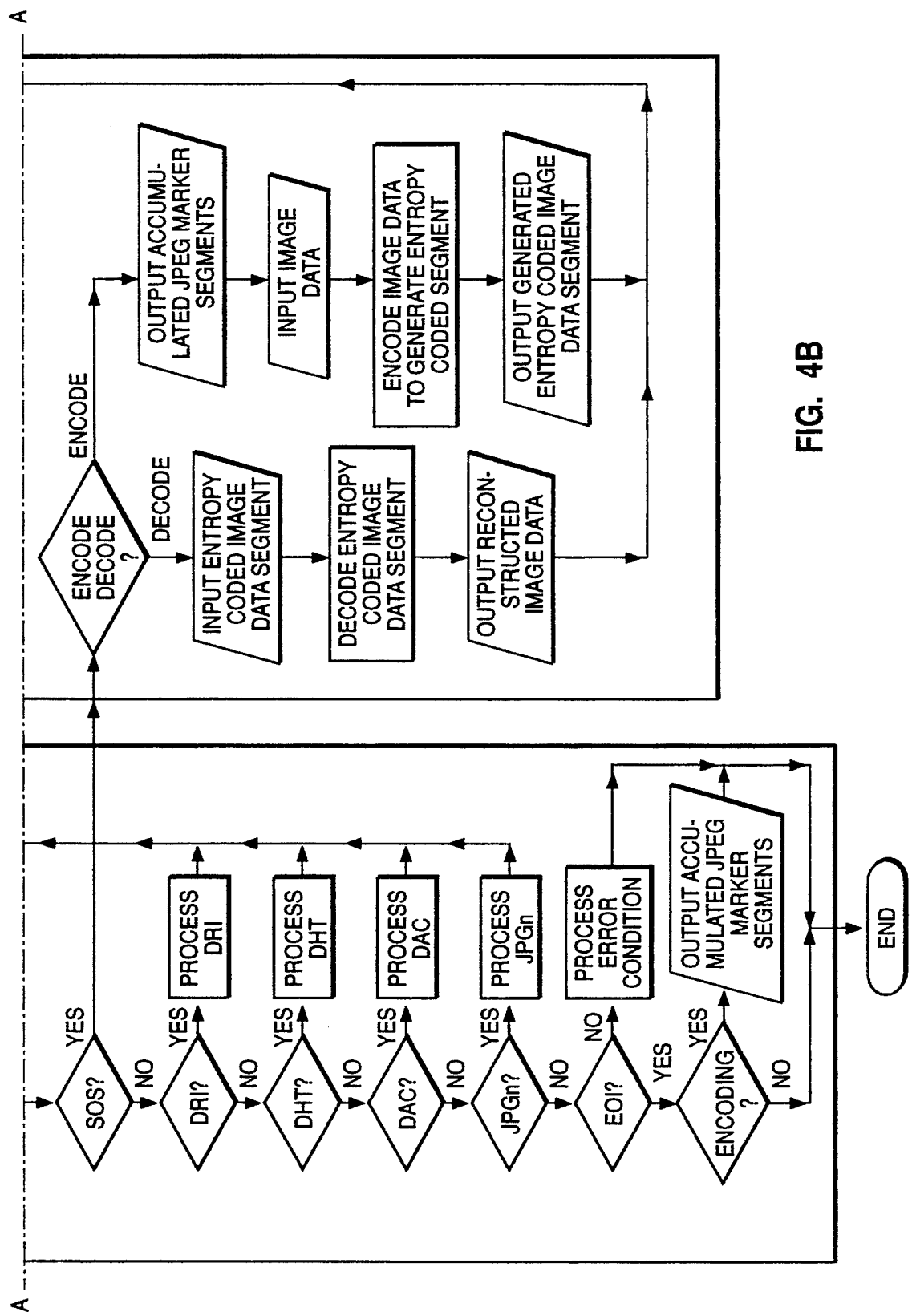

FIG. 4 illustrates a preferred embodiment of the invention. This embodiment implements an encoder 220 and decoder 240 (FIG. 3) for JPEG data streams, as defined in the above-referenced ISO CD 10918-1. The system consists of a parser residing in the computer 100 in the RAM 130 connected to an encoder/decoder subsystem. The parser accepts as input an indication of whether encoding or decoding is to be performed and a set of JPEG marker segments (if encoding) or a JPEG compressed data stream containing marker segments (if decoding).

The parser examines the set of marker segments to recognize and interpret the various markers listed in Annex B of the above-referenced ISO CD 10918-1. As each marker is recognized, appropriate actions are taken by the system, and if the system is encoding, the marker segments are accumulated for insertion into the output compressed data stream at the appropriate point. The marker segments and their syntax are documented in the above-referenced ISO CD 10918-1.

Actions taken by the system in response to the various marker segments follow:

SOI The SOI (start-of-image) marker causes the system to prepare to encode or decode an image.

DQT The DQT (define quantization tables) marker causes one or more quantization tables to be read from the marker segment and stored.

DHP The DHP (define hierarchical progression) marker causes the system to prepare for a sequence of JPEG frames (as per above-referenced ISO CD 10918-1, Annex B, Page B-5, FIG. B.2) and causes a series of parameters which describe the image size, number of components and relative sampling ratios, sample precision, etc. to be read and stored.

EXP The EXP (expand reference component(s)) marker causes the system to read horizontal and vertical expansion flags, and apply the appropriate expansion as per Annex J of the CD.

COM The COM (comment) marker causes a comment to be read from the marker segment and optionally displayed at the terminal.

SOFn An SOFn (start of frame) marker causes a series of parameters which describe the image (size, number of components and relative sampling ratios, sample precision, etc.) and the type of compression to be performed (sequential/progressive/lossless/differential, Huffman or arithmetic entropy coding) to be read and stored.

APPn An APPn (application segment) marker causes the system to skip the data associated with this marker segment.

SOS The SOS (start of scan) marker segment is discussed below.

DRI The DRI (define restart interval) marker causes the system to read and store the restart interval.

DHT The DHT (define Huffman table(s)) marker causes one or more Huffman coding tables to be read from the marker segment and stored.

DAC The DAC (define arithmetic coding conditioning (s)) marker causes one or more arithmetic coding conditioning values to be read from the marker segment and stored.

JPGn A JPGn (JPEG extensions) marker causes the system to skip the data associated with this marker segment.

EOI The EOI (end-of-image) marker indicates that the end of the data stream has been reached; if the system is encoding, any accumulated marker segments are appended to the compressed data stream before processing terminates.

Process Error Condition reports that no valid marker was found where one was expected, and the system stops processing the input data stream.

The encoder/decoder subsystem is utilized whenever the parser recognizes an SOS (start of scan) marker, since in the JPEG compression scheme this is the point at which the compressed image data is inserted. The parser interprets the information in the SOS marker segment to determine the precise operation to be performed (e.g. sequential or progressive coding, which component(s) are coded, etc.) and calls the encoder/decoder subsystem, providing it with the information extracted from the various marker segments that have been interpreted. If the system is decoding, the entropy coded image data segment following the SOS marker segment is read in to the decoder, and is decoded as specified by the already-interpreted marker segments and the resulting reconstructed image data is output.

If the system is encoding, any accumulated JPEG marker segments are appended to the compressed data stream. Image data is then read in to the encoder and is encoded as specified by the already-interpreted marker segments to generate an entropy coded image data segment, which is appended to the compressed data stream following the accumulated JPEG marker segments. In either case, control then returns to the parser, which proceeds to interpret the next available marker.

The encoder/decoder subsystem may be invoked several times in the course of encoding or decoding a single image, since JPEG allows variations such as the compression of each component of a multi-component image in a separate scan, or compression of a single component in multiple scans in a progressive manner. Further details of the JPEG encode/decode procedures are described in the above-referenced ISO CD 10918-1 in Section 6, "Encoder requirements," and Section 7, "Decoder requirements", and the annexes referenced therein.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. Apparatus for controlling a data stream generator in a memory, comprising:
   (a) means for transmitting information including data and a plurality of marker segments to an encoder;
   (b) processor means for analyzing the plurality of marker segments to determine an encoding operation;
   (c) processor means for encoding the data in said information in response to said encoding operation; and
   (d) processor means for merging the marker segments to the encoded data.

2. Apparatus as recited in claim 1, further comprising storage means for storing the encoded data.

3. Apparatus as recited in claim 1, wherein said encoding operation specifies a method for compressing the data.

4. Apparatus as recited in claim 1, wherein said processor means for encoding encodes said data according to a Joint Photographic Experts Group (JPEG) standard format.

5. Apparatus as recited in claim 1, wherein said encoding operation specifies Huffman coding of the data.

6. Apparatus as recited in claim 1, wherein said encoding operation specifies arithmetic encoding for compression of the data.

7. Apparatus as recited in claim 1, wherein said encoding operation specifies run length encoding for compression of the data.

8. Apparatus as recited in claim 1, wherein said encoding operation specifies predictive encoding for compression of the data.

9. Apparatus for generating and interpreting a data stream in a memory, comprising:
   (a) means for transmitting information including data and marker segments to an encoder;
   (b) processor means for parsing the marker segments into compression operators;
   (c) processor means for encapsulating the data within the marker segments to create a single data stream said processor means being responsive to said compression operators; and
   (d) means for storing the single data stream.

10. Apparatus for specifying data encapsulation control parameters to a data encapsulation system comprising:
   (a) a reusable set of control parameters passed to the data encapsulation system in the form of structured fields;
   (b) processor means for parsing the structured fields creating encapsulation orders;
   (c) processor means for encoding information in accordance with the encapsulation orders; and
   (d) data encapsulator means for encapsulating said encoded information within said structured fields.

11. Apparatus for specifying data extraction control parameters to a data extraction system for extracting information from an encapsulated data stream, the apparatus comprising:
   (a) a common set of control parameters passed to the data extraction system in the form of structured fields;
   (b) processor means for parsing the structured fields creating extraction orders; and
   (c) processor means for extracting information from said encapsulated data stream in response to the extraction orders.

12. A method for controlling a data stream generator in a memory, comprising the steps of:
   (a) transmitting information having data and a plurality of marker segments to an encoder;
   (b) transforming the plurality of marker segments into encoding control orders;
   (c) encoding the data according to the encoding control orders; and
   (d) combining the marker segments and the encoded data to form an encoded data stream.

13. The method as recited in claim 12, further comprising the step of storing the encoded data stream.

14. The method as recited in claim 12, wherein the encoding step compresses the data.

15. The method as recited in claim 12, wherein the encoding step compresses the data in accordance with a Joint Photographic Experts Group (JPEG) standard.

16. The method as recited in claim 12, wherein the encoding step compresses the data with an arithmetic encoder.

17. The method as recited in claim 12, wherein the encoding step compresses the data with a run length encoder.

18. The method as recited in claim 12, wherein the encoding step compresses the data with a predictive encoder.

19. Apparatus for controlling a data stream generator in a memory, comprising:
   (a) means for transmitting information having data and a plurality of marker segments to an encoder;
   (b) processor means for transforming the plurality of marker segments into encoding operations;
   (c) processor means for encoding the data according to said encoding operations;
   (d) processor means for merging the marker segments and the encoded data to form an encoded data stream;
   (e) decoder means for decoding said encoded data stream, said decoder means including:

-processor means for transforming the plurality of marker segments in said encoded data stream into decoding orders; and -processor means for decoding the encoded data in response to said decoding orders.

20. A method for controlling a data stream generator in a memory, comprising the steps of:
(a) transmitting information including data and a plurality of marker segments to an encoder;
(b) transforming the plurality of marker segments into encoding operations;
(c) encoding the data in response to said encoding operations;
(d) combining the marker segments and the encoded information to create an encoded data stream;
(e) transforming the plurality of marker segments in said encoded data stream into decoding operations; and
(f) decoding the data from said encoded data stream according to said decoding operations.

21. A method for encoding data into an encoded data stream, the encoded data stream having a format specified by a plurality of marker segments each specifying an encoding parameter, the method comprising the steps of:
generating an encoding description, said encoding description specifying a plurality of encoding parameters in a first format;
transforming said plurality of encoding parameters in said first format into a plurality of encoding operations in a second format;
applying said encoding operations to said data to create encoded data;
merging said encoding description and said encoded data to form said encoded data stream.

22. A system for encoding and decoding data, the system comprising:
input means for receiving input data, said input data being either encoded data containing a plurality of marker segments or unencoded data accompanied separately by marker segment skeletons;
means for testing said input data to determine whether it is encoded data or unencoded data;
means for transforming said marker segments in said encoded data into decoding orders if said input data is encoded data;
means for decoding said encoded data in response to said decoding orders if said input data is encoded data;
means for transforming said marker segment skeletons into encoding orders if said input data is unencoded data;
means for encoding said input data in response to said encoding orders if said input data is unencoded data; and
means for merging said encoded input data and said marker segment skeletons to create an encoded data stream if said input data is unencoded data.

23. The system of claim 22, wherein said marker segments and said marker segment skeletons conform to a JPEG standard.

24. The system of claim 22, wherein said encoding orders specify encoding by applying a Huffman algorithm.

25. The system of claim 22, wherein said encoding orders specify encoding by applying an arithmetic encoding operation.

26. The system of claim 22, wherein said encoding orders specify encoding by applying a run length encoding operation.

27. The system of claim 22, wherein said encoding orders specify encoding by applying a predictive encoding operation.

28. The system of claim 22, further comprising storage means for storing said encoded data stream.

29. The system of claim 22, wherein said means for transforming said marker segments and said means for transforming said marker segment skeletons comprise a parser.

30. A method of encoding and decoding input data, said method comprising the steps of:
specifying a plurality of marker segments that conform to a first encoding specification;
testing said input data to determine whether or not it is already encoded;
transforming said plurality of marker segments into encoding orders if said testing step determines the data is not encoded;
encoding said input data according to said encoding orders if said testing step determines the data is not encoded;
merging said marker segments and said encoding orders to form an encoded data stream, if said testing determines the data is not encoded;
extracting said marker segments from said input data if said testing determines the data is encoded;
transforming the marker segments into decoder orders, if said test determines the data is encoded;
decoding said encoded data if said test determines said data is encoded.

31. The method of claim 30, wherein said first encoding specification is a JPEG standard.

32. The method of claim 30, further comprising storing said encoded data stream on a storage device if said testing determines the data is not encoded.

33. The method of claim 30, wherein said encoding step compresses said input data and said decoding step decompresses said encoded data stream.

* * * * *